(12) United States Patent
Chou

(10) Patent No.: US 10,781,032 B2
(45) Date of Patent: Sep. 22, 2020

(54) TIRE SEALANT DISPENSER

(71) Applicant: UNIK WORLD INDUSTRIAL CO., LTD., Tainan (TW)

(72) Inventor: Wen-San Chou, Tainan (TW)

( * ) Notice: Subject to any disclaimer, the term of this patent is extended or adjusted under 35 U.S.C. 154(b) by 0 days.

(21) Appl. No.: 16/408,455

(22) Filed: May 9, 2019

(65) Prior Publication Data
US 2019/0344954 A1 Nov. 14, 2019

(51) Int. Cl.
*B65D 83/20* (2006.01)
*B65D 83/24* (2006.01)
*B29C 73/02* (2006.01)

(52) U.S. Cl.
CPC .......... *B65D 83/206* (2013.01); *B29C 73/025* (2013.01); *B65D 83/24* (2013.01)

(58) Field of Classification Search
CPC ...... B29C 73/025; B65D 83/206; B65D 83/24
USPC .... 222/80–83.5, 88–89, 400.7; 81/15.2–15.7
See application file for complete search history.

(56) References Cited

U.S. PATENT DOCUMENTS

| | | | | |
|---|---|---|---|---|
| 2,120,248 A * | 6/1938 | Hinchman | ............... | F16K 13/04 222/5 |
| 2,778,435 A * | 1/1957 | Downham | ............ | A62C 13/64 169/89 |
| 3,010,520 A * | 11/1961 | Seaberg | ................. | A62C 13/64 169/77 |
| 4,440,316 A * | 4/1984 | Christine | ............. | B65D 47/248 222/183 |
| 5,411,175 A * | 5/1995 | Armstrong | ............ | A61F 9/0008 222/105 |
| 5,413,247 A * | 5/1995 | Glasa | ........................ | B63C 9/18 222/23 |
| 8,016,002 B2 * | 9/2011 | Yoshida | ................ | B29C 73/166 141/38 |
| 8,336,733 B2 * | 12/2012 | Laws | .................... | B65D 83/226 222/5 |
| 8,459,150 B2 * | 6/2013 | Yoshida | ................ | B29C 73/166 141/192 |
| 9,545,763 B2 * | 1/2017 | Chou | .................... | B29C 73/025 |
| 9,682,520 B2 * | 6/2017 | Chou | .................... | B29C 73/025 |
| 10,105,562 B2 * | 10/2018 | Arnette | .................. | A62C 13/64 |
| 2009/0283540 A1 * | 11/2009 | Kelly | .................... | B67D 1/0418 222/1 |
| 2010/0071801 A1 * | 3/2010 | Sekiguchi | ............. | B29C 73/166 141/38 |
| 2010/0101375 A1 * | 4/2010 | Yoshida | .................. | B60S 5/043 81/15.6 |
| 2014/0124543 A1 * | 5/2014 | Dahl | .................... | B67D 1/0848 222/400.7 |
| 2014/0261878 A1 * | 9/2014 | Jhou | ..................... | B29C 73/163 141/38 |
| 2019/0344954 A1 * | 11/2019 | Chou | .................... | B65D 83/00 |

\* cited by examiner

*Primary Examiner* — Paul R Durand
*Assistant Examiner* — Andrew P Bainbridge

(57) ABSTRACT

A tire sealant dispenser matches with an air compressor and contains a body in which chemical fluid (such as tire sealant) is filled, a cap connected on an opening of the body, a drive element configured to urge a punch element to pierce a film, such that an air conduit is in communication with a sealant conduit, pressurized air flows into the body via the air conduit from the air compressor, and the chemical fluid flows out of the sealant conduit.

8 Claims, 12 Drawing Sheets

TIRE SEALANT DISPENSER

FIELD OF THE INVENTION

The present invention relates to a tire sealant dispenser in which the chemical fluid is filled.

BACKGROUND OF THE INVENTION

With reference to FIG. 12, a tire sealant dispenser 9 contains a cap 91, a body 92, and a hollow tube 93.

The body 92 includes chemical fluid filled therein and configured to repair the tire. The cap 91 includes a feeding tube 96 and a supply pipe 97, wherein the feeding tube is connected with an air compressor to produce pressurized gas, and the supply pipe is configured to output chemical fluid. The hollow tube 93 is connected with a connection pipe 95 of the cap 91. After the cap 91 is coupled with the body 92, the hollow tube 93 is accommodated in the body 92 so that the pressurized gas is inputted into the chemical fluid 94 from the air compressor via the feeding tube 96, such that the chemical fluid 94 flows into the connection pipe 95, the supply pipe 97, and a hose via the hollow tube 93 to communicate with an air nozzle of the tire. However, the hollow tube 93 vibrates to remove from the connection pipe 95 and to drop on a bottom of the body 92, when the pressurized gas is inputted into the chemical fluid 94. Thereafter, a gap 98 produces between the hollow tube 93 and the connection pipe 95, and the pressurized gas leaks out of the gap 98 and cannot force the chemical fluid 94 smoothly.

The present invention has arisen to mitigate and/or obviate the afore-described disadvantages.

SUMMARY OF THE INVENTION

The primary aspect of the present invention is to provide a tire sealant dispenser in which the chemical fluid is filled, wherein the cap is connected on an opening of the body, the drive element is operated to push the punch element to pierce the film so that the air conduit communicates with the sealant conduit, and pressurized air flows into the body via the air conduit from the air compressor, and the chemical fluid flows out of the sealant conduit.

Further aspect of the present invention is to provide a tire sealant dispenser which contains the drive element swinging along the pair of posts to push the punch element to pierce the film, such that pressurized gas forces the chemical fluid to flow out of the supply pipe.

Another aspect of the present invention is to provide a tire sealant dispenser which contains the flexible sheet of the bottom rim of the cylindrical pipe abutting against the holder of the body to produce a rebounding force by which the cylindrical pipe matingly contacts with the second tube as moving or operating the tire sealant dispenser, hence the stepped shoulder of the guide cavity keeps abutting against the second tube of the cap, thus inflating air into the tire effectively and repairing the tire safely.

DETAILED DESCRIPTION OF THE PREFERRED EMBODIMENTS

Figure 1:
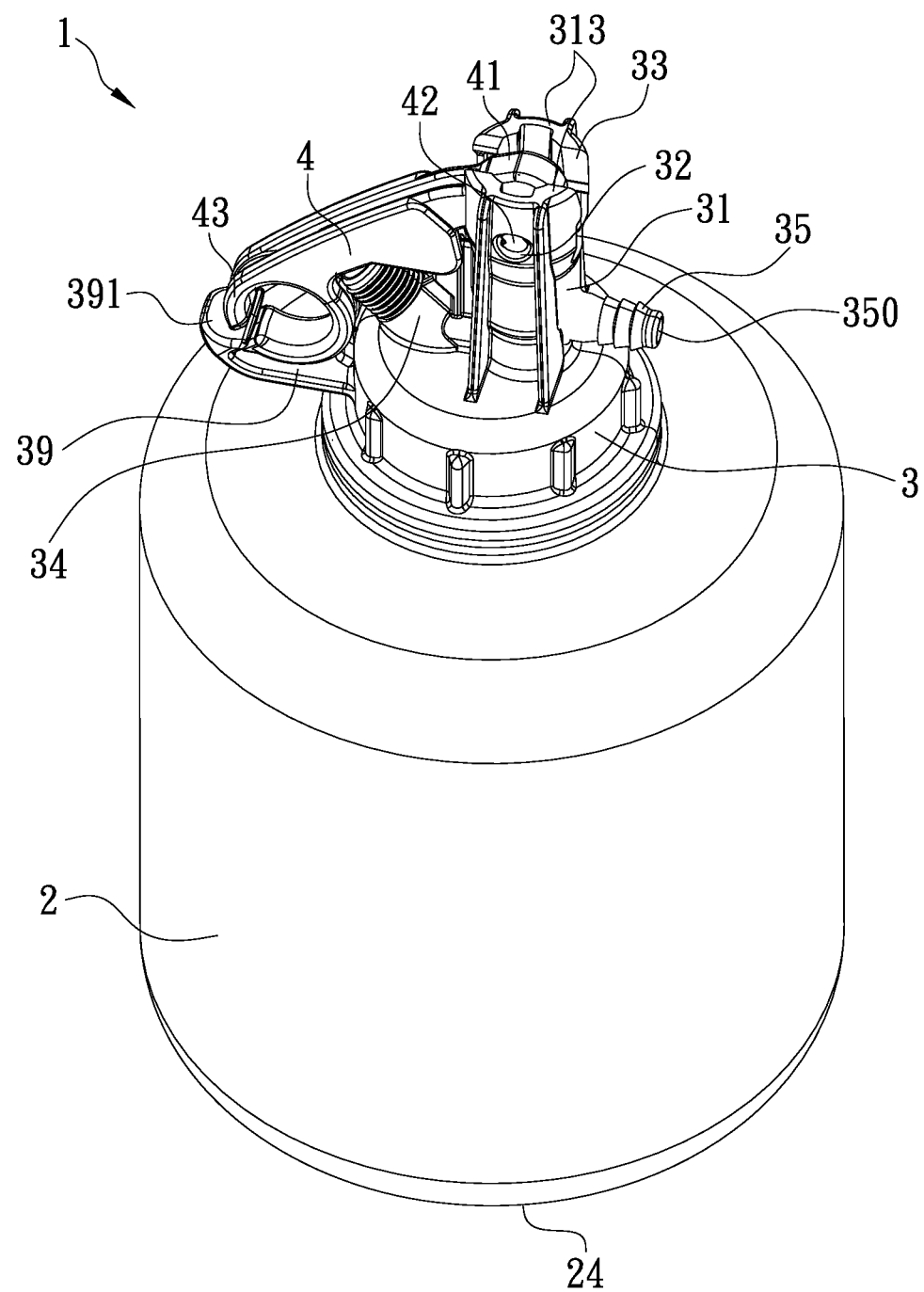
FIG. 1 is a perspective view showing the assembly of a tire sealant dispenser according to a preferred embodiment of the present invention.
Figure 2:
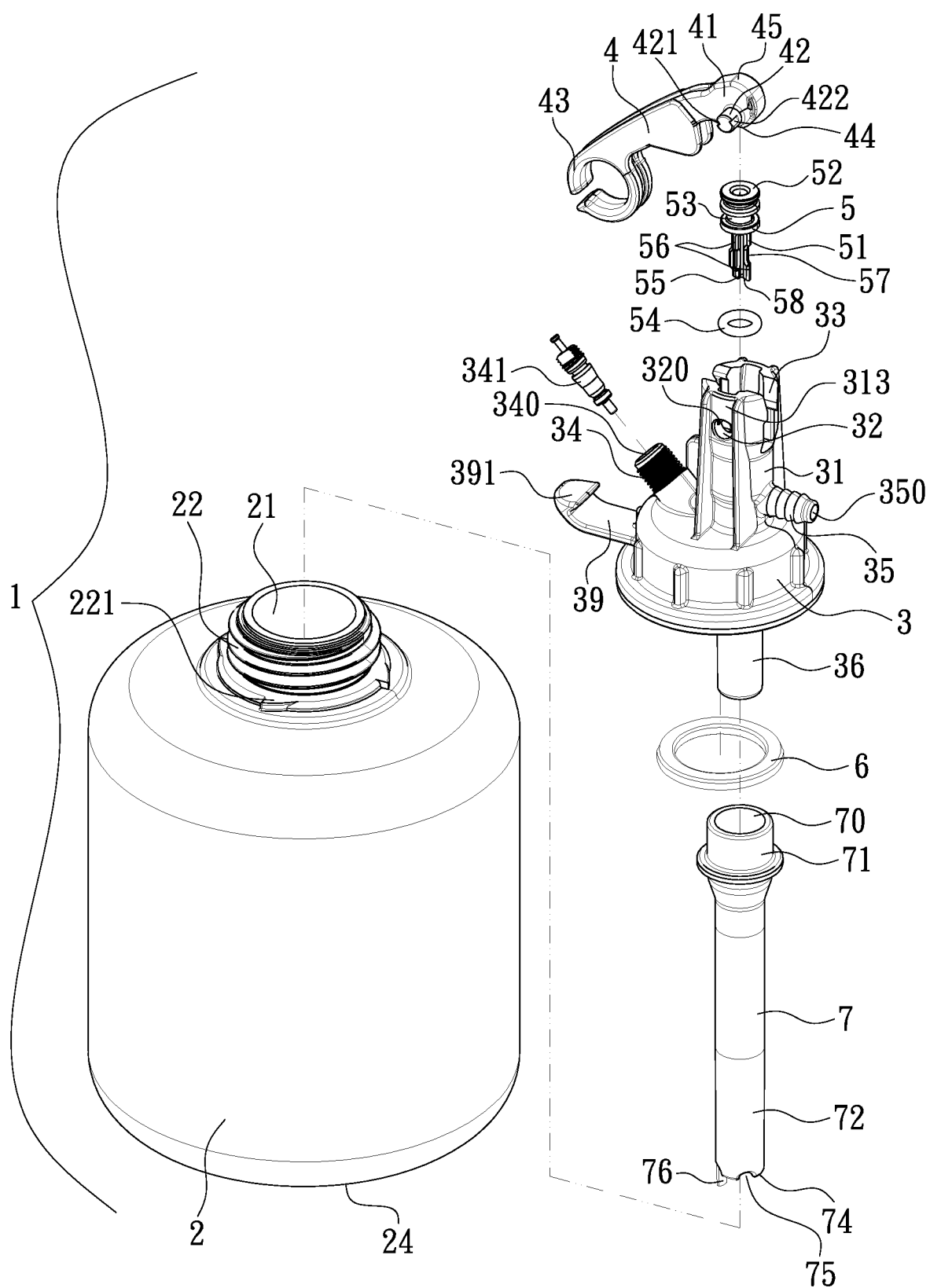
FIG. 2 is a perspective view showing the exploded components of the tire sealant dispenser according to the preferred embodiment of the present invention.

With reference to FIGS. 1-2, a tire sealant dispenser 1 according to a preferred embodiment of the present invention matches with an air compressor (not shown) and comprises a body 2 in which chemical fluid 25 (such as tire sealant) is filled, a cap 3 connected on an opening 21 of the body 2, a drive element 4 rotatably connected on the cap 3 and configured to urge a punch element 5 to pierce a film 38, such that an air conduit 340 is in communication with a sealant conduit 350, pressurized air flows into the body 2 via the air conduit 340 from the air compressor, and the chemical fluid 25 flows out of the sealant conduit 350.

Figure 5:
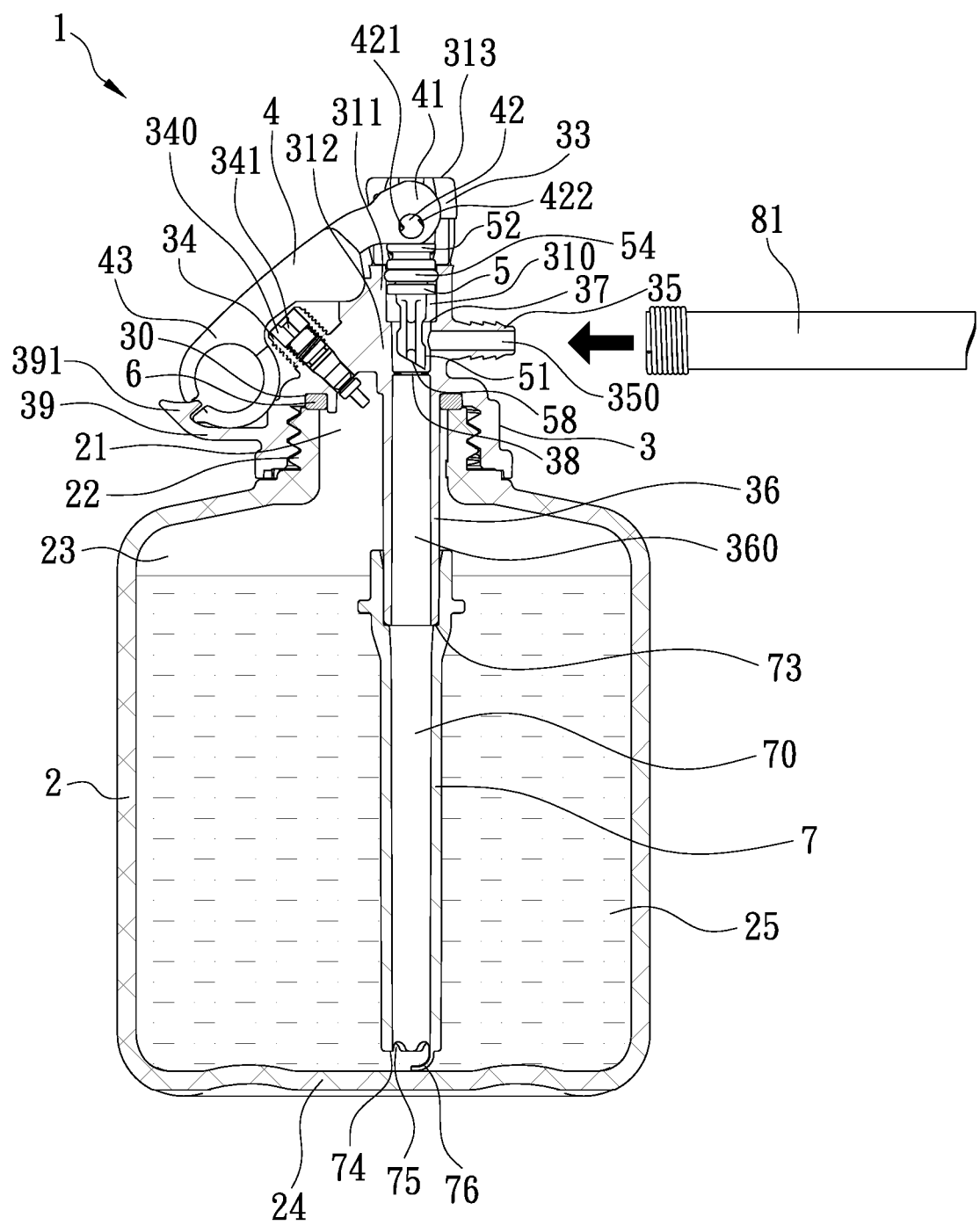
FIG. 5 is a cross sectional view showing the operation of the tire sealant dispenser according to the preferred embodiment of the present invention.

Referring to FIGS. 1, 2 and 5, the tire sealant dispenser 1 comprises the body 2 and the cap 3, wherein the body 2 is hollow and includes an accommodation chamber 23 defined therein, the opening 21 defined on a first end of the body 2, a holder 24 formed on a second end of the body 2, a male threaded section 22 arranged on an outer wall of the first end of the body 2 outside the opening 21, and multiple ratchets 221 formed below the male threaded section 22, wherein the accommodation chamber 23 is configured to accommodate the chemical fluid 25.

Figure 3:
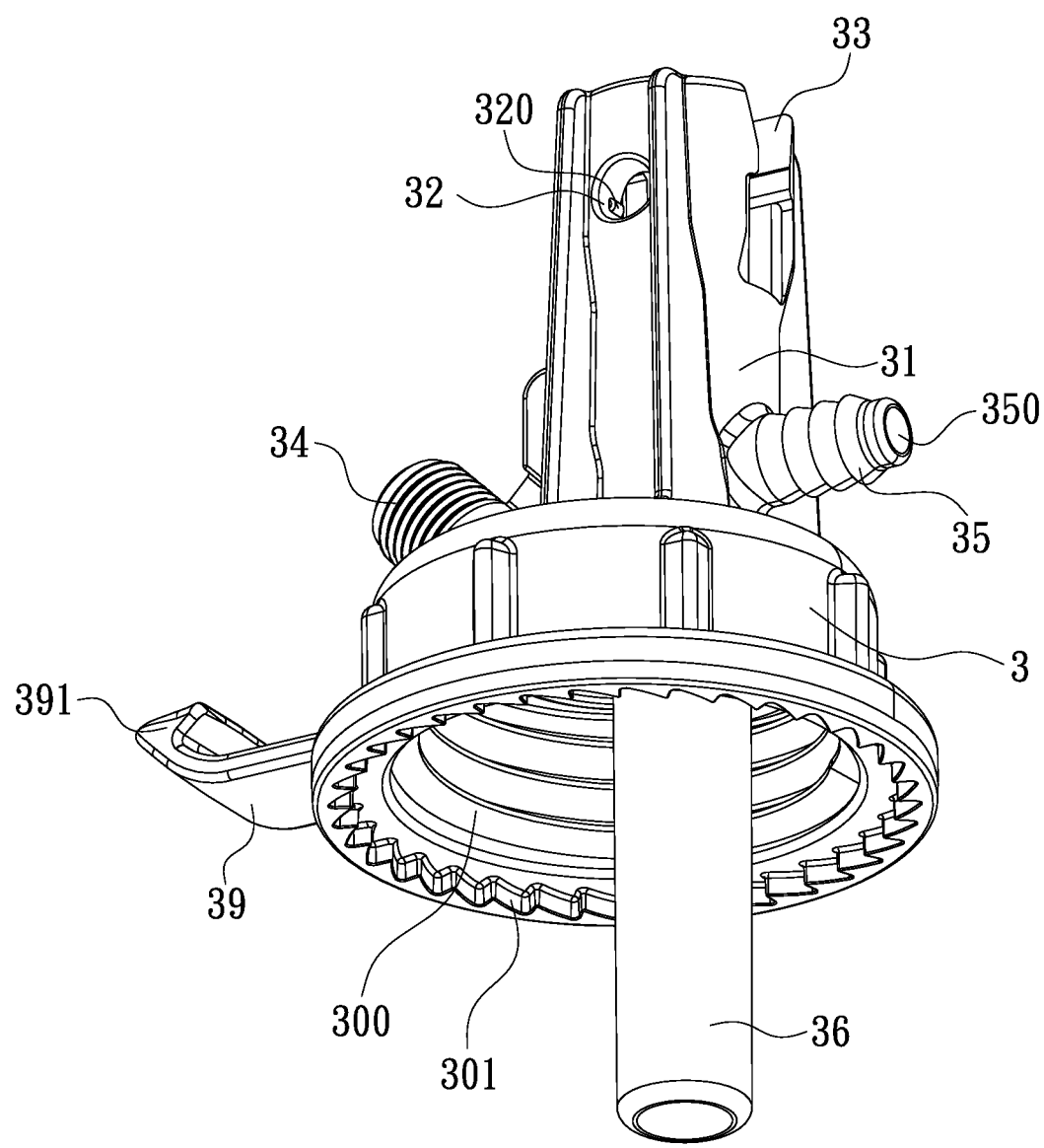
FIG. 3 is another perspective view showing the assembly of a part of the tire sealant dispenser according to the preferred embodiment of the present invention.
Figure 4:
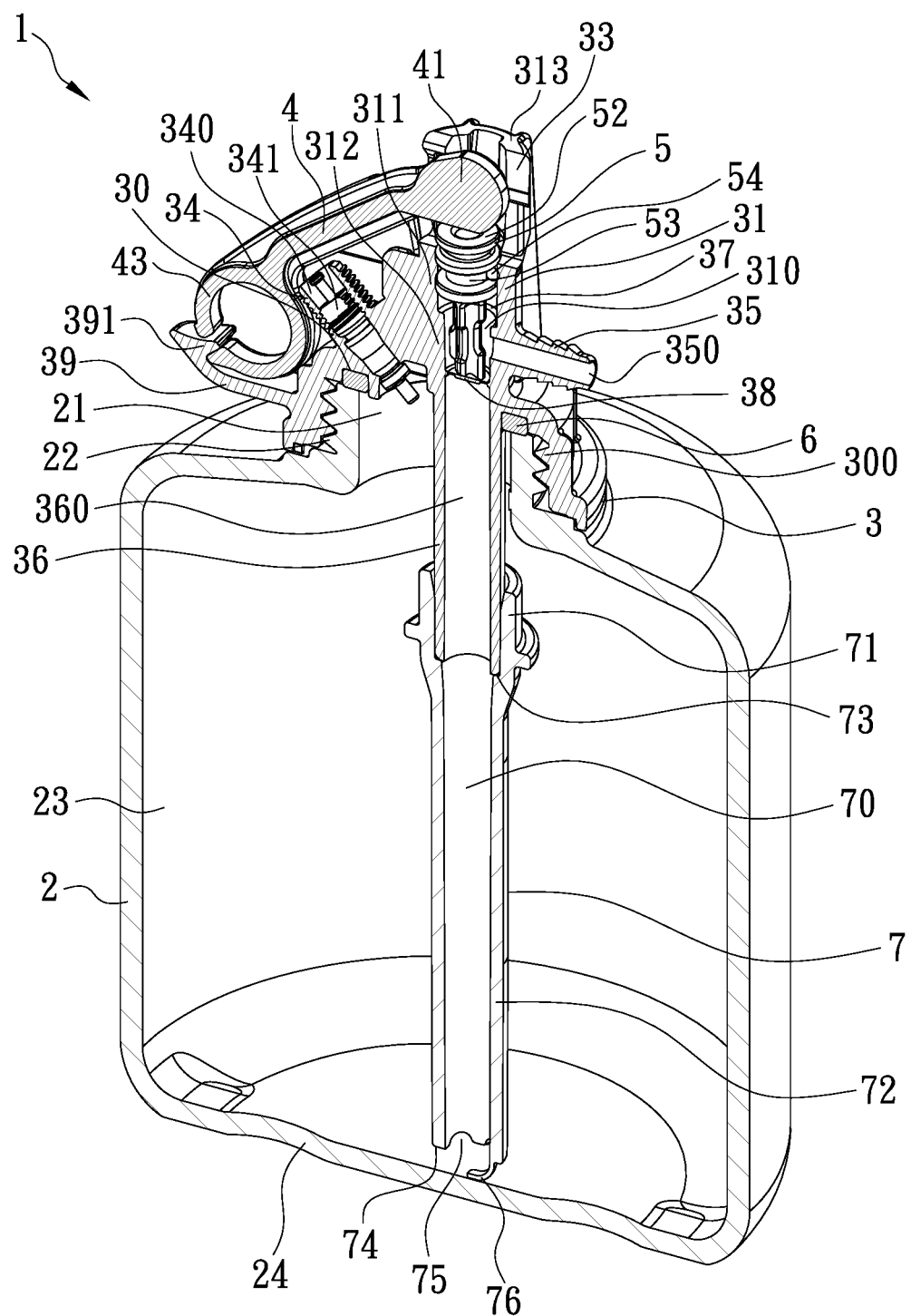
FIG. 4 is a cross-sectional perspective view showing the assembly of the tire sealant dispenser according to the preferred embodiment of the present invention.
Figure 10:
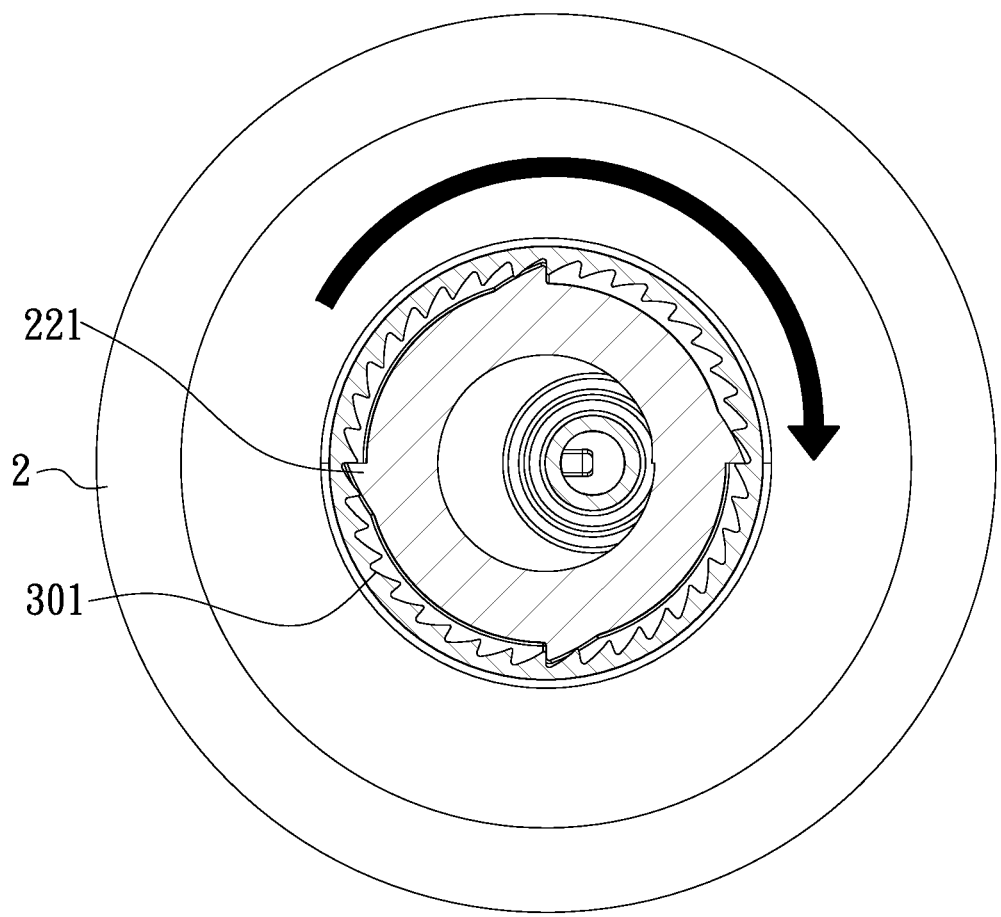
FIG. 10 is a cross sectional view taken along the line A-A of FIG. 9.

As shown in FIGS. 3-4, the cap 3 includes a female threaded section 300 arranged on an inner wall thereof, multiple recesses 301 formed around a bottom of the inner wall of the cap 3, a peripheral groove 30 surrounding a top of the inner wall of the cap 3 so as to accommodate a washer 6. The female threaded section 300 of the cap 3 is screwed with the male threaded section 22 of the opening 21 of the body 2. When the cap 3 is connected with the body 2, the opening 21 of the body 2 is closed tightly by using the washer 6 and the cap 3 is not removal from the opening 21. After rotating the cap 3, the multiple recesses 301 of the cap 3 engage with the multiple ratchets 221 of the body 2 respectively, as shown in FIG. 10, such that the cap 3 is not removable so as to avoid leakage of the chemical fluid 25.

The cap 3 further includes a first tube 31 extending to the top of the inner wall thereof, a second tube 36 extending downward beyond the bottom of the inner wall of the cap 3 and communicating with the first tube 31. The first tube 31 has a channel 310 formed therein, an upper section 311, a lower section 312, an extending portion 313 formed outside and partially extending over the upper section 311, an orifice 32 defined on the extending portion 313, a protrusion 320 formed inside the orifice 32, two opposite slots 33 defined on the extending portion 313, wherein a top of each of the two opposite slots 33 is open and a bottom of each slot 33 is closed. The first tube 31 has a feeding tube 34 and a supply pipe 35, wherein the feeding tube 34 has the air conduit 340 defined therein and accommodating an air valve 341 which communicates with the accommodation chamber 23 of the body 2, wherein a diameter of the upper section 311 of the first tube 31 is more than the lower section 312 of the first tube 31, and a stepped portion 37 is defined between the upper section 311 and the lower section 312 of the first tube 31. The supply pipe 35 has a sealant conduit 350 defined therein and communicating with the channel 310 of the first tube 31, and the second tube 36 has a passage 360 formed therein and accommodating the film 38 configured to separate the channel 310 of the first tube 31 from the passage 360 of the second tube 36.

The punch element 5 includes a column 51 extending from a first end thereof, a head 52 extending from a second end of the punch element 5, a notch 53 surrounding the head 52, an O ring 54 fitted in the notch 53, multiple troughs 55 separately formed on the column 51, a rib 56 defined between any two adjacent of the multiple troughs 55, a cutout 57 formed on the rib 56, and a tilted tab 58 arranged on a distal end of the column 51. The punch element 5 is accommodated into the channel 310 of the first tube 31 and is located above the film 38.

A cylindrical pipe 7 includes a guide cavity 70 defined therein, a first segment 71, and a second segment 72, wherein a diameter of the first segment 71 is more than the second segment 72. The cylindrical pipe 7 further includes a stepped shoulder 73 defined between the first segment 71 and the second segment 72, multiple gaps 75 formed on a bottom rim 74 of the cylindrical pipe 7, and a flexible sheet 76 extending from the bottom rim 74. The first segment 71 of the cylindrical pipe 7 is fitted with the second tube 36 of the cap 3, and the second tube 36 abuts against the stepped shoulder 73 of the guide cavity 70, wherein cylindrical pipes 7 of various lengths are replaceable so as to match with bodies 2 of different sizes.

The drive element 4 includes an eccentric cam 41 formed on an end thereof, a pair of posts 42 extending outward from two sides of the eccentric cam 41 respectively, wherein each of the pair of posts 42 has two indentations 421, 422 defined on each post 42. The drive element 4 further includes a C-shaped actuation portion 43 formed on the other end thereof, and the drive element 4 is rotatably connected with the orifice 32 of the first tube 31 by using the pair of posts 42, wherein the eccentric cam 41 is located on an opening end of the first tube 31 and abuts against the head 52 of the punch element 5, and the C-shaped actuation portion 43 swings along the pair of posts 42. The two opposite slots 33 of the extending portion 313 of the first tube 31 allow the drive element 4 to swing semi-circumferentially therealong.

After the punch element 5, the cylindrical pipe 7 and the drive element 4 are connected on the cap 3, and the cap 3 is coupled with the body 2, the second tube 36 of the cap 3 and the cylindrical pipe 7 are housed in the accommodation chamber 23 of the body 2, as shown in FIG. 4.

Figure 6:
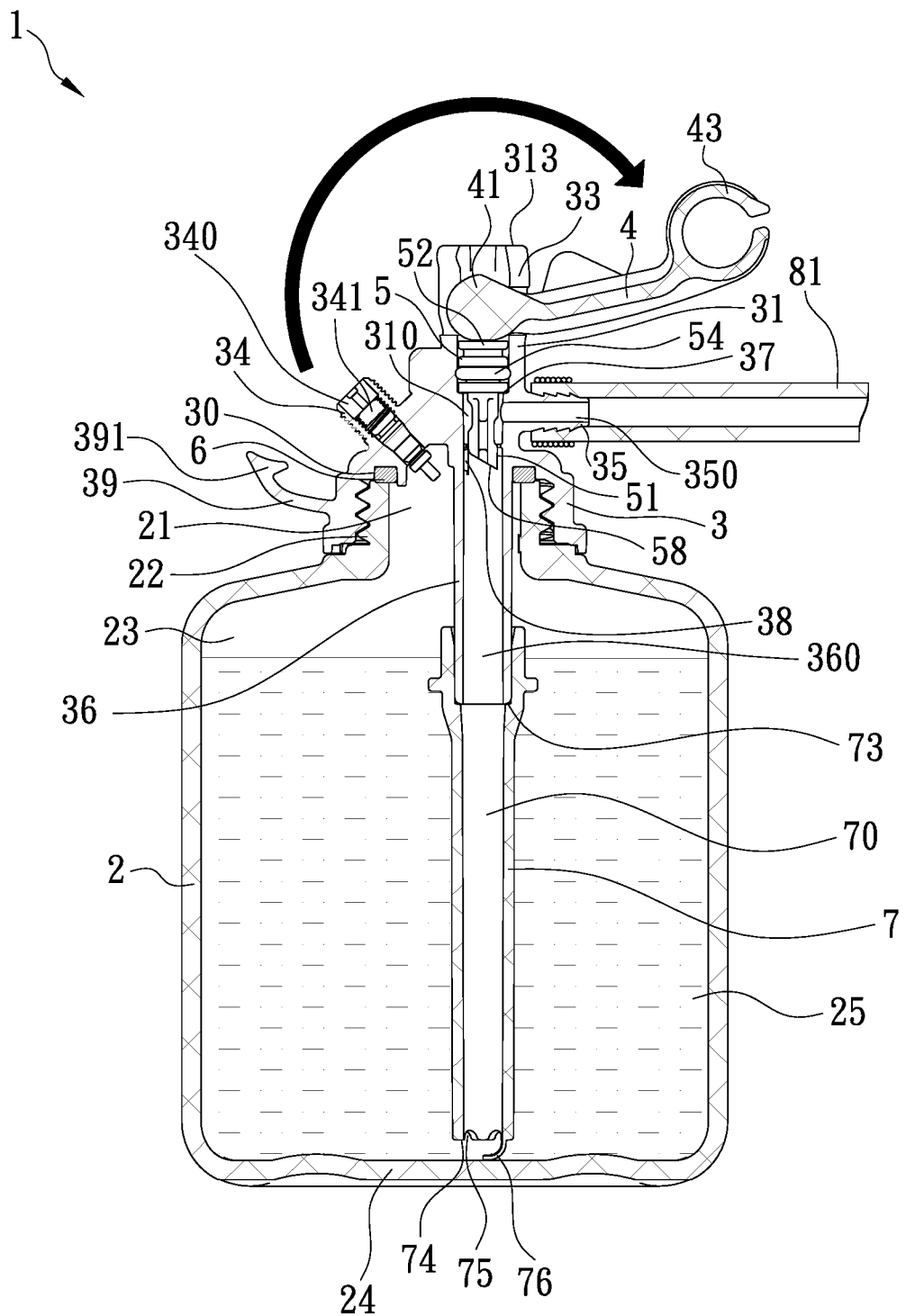
FIG. 6 is another cross sectional view showing the operation of the tire sealant dispenser according to the preferred embodiment of the present invention.
Figure 7:
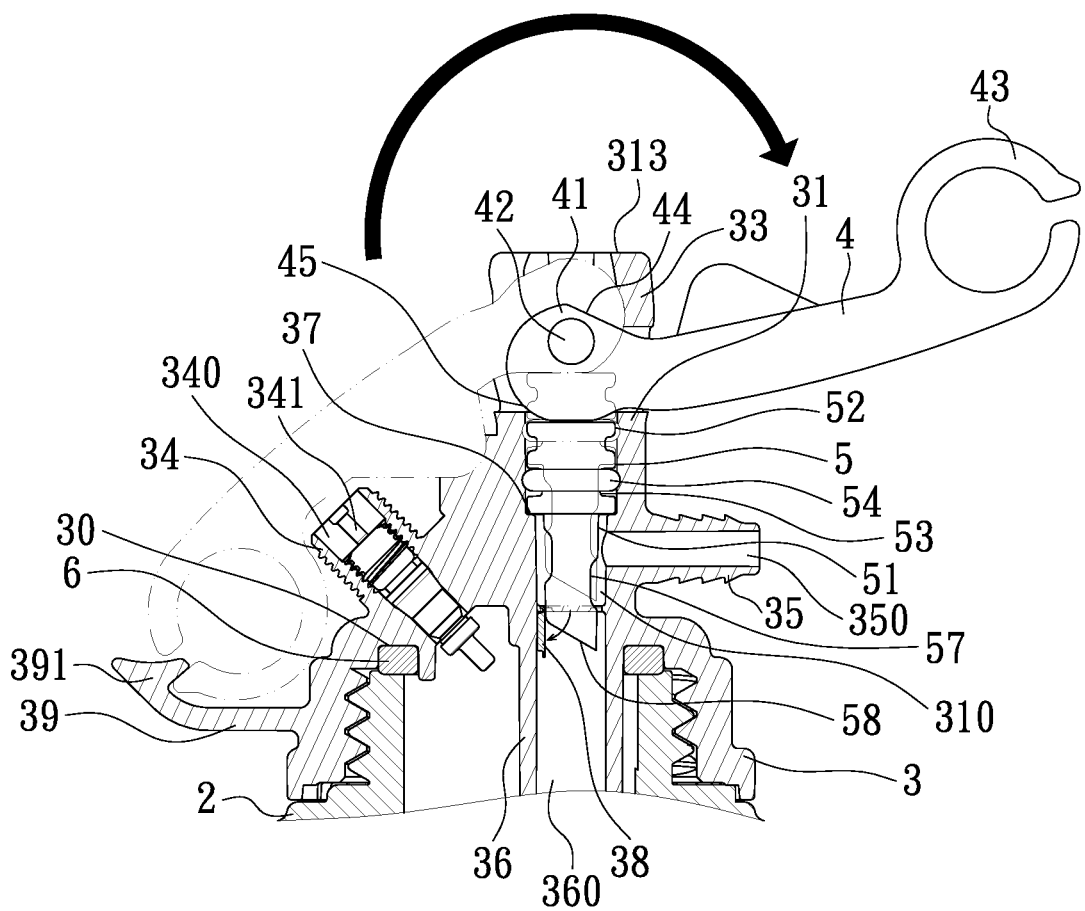
FIG. 7 is a cross sectional view showing the operation of a part of the tire sealant dispenser according to the preferred embodiment of the present invention.
Figure 8:
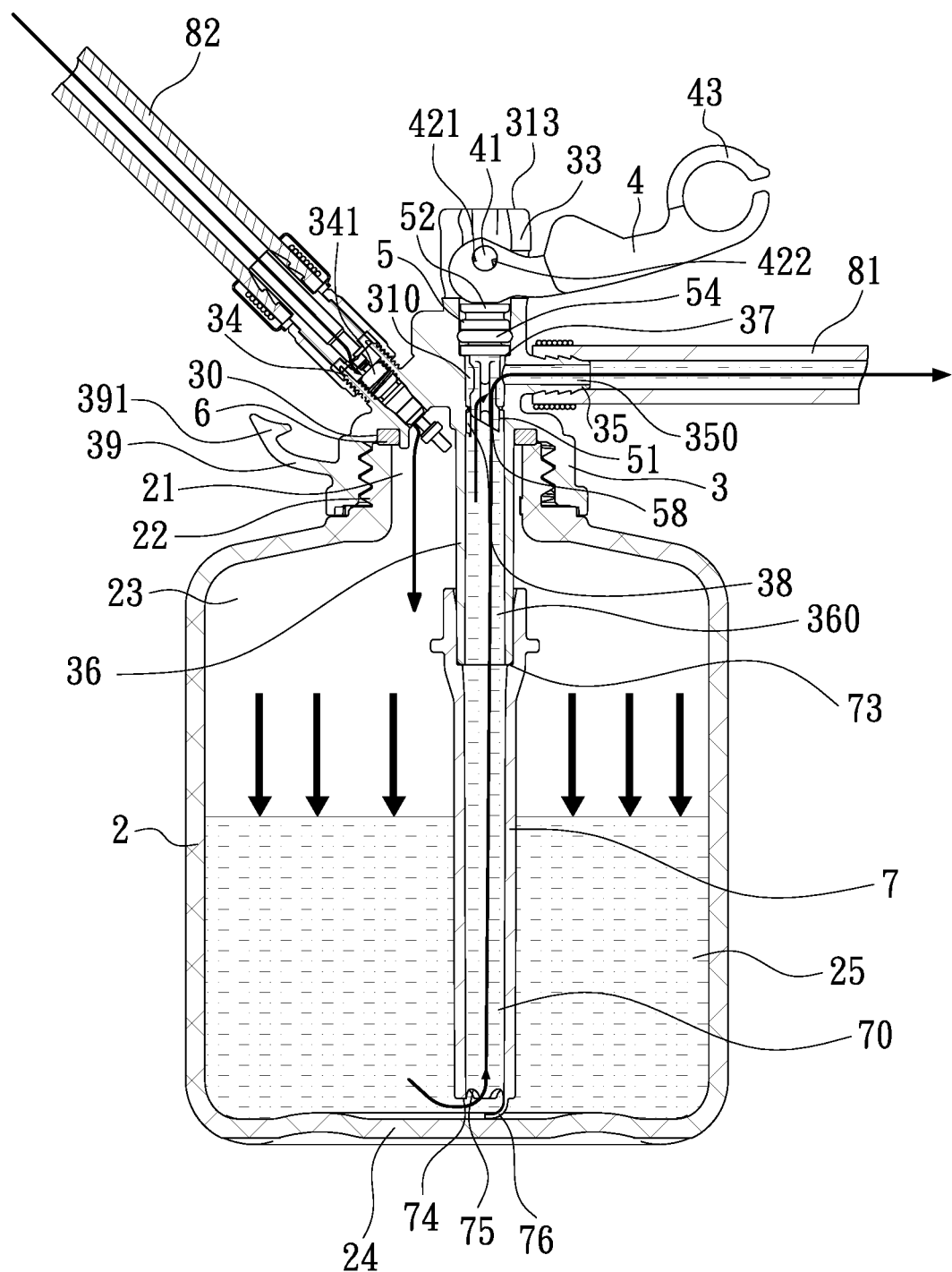
FIG. 8 is another cross sectional view showing the operation of the tire sealant dispenser according to the preferred embodiment of the present invention.
Figure 9:
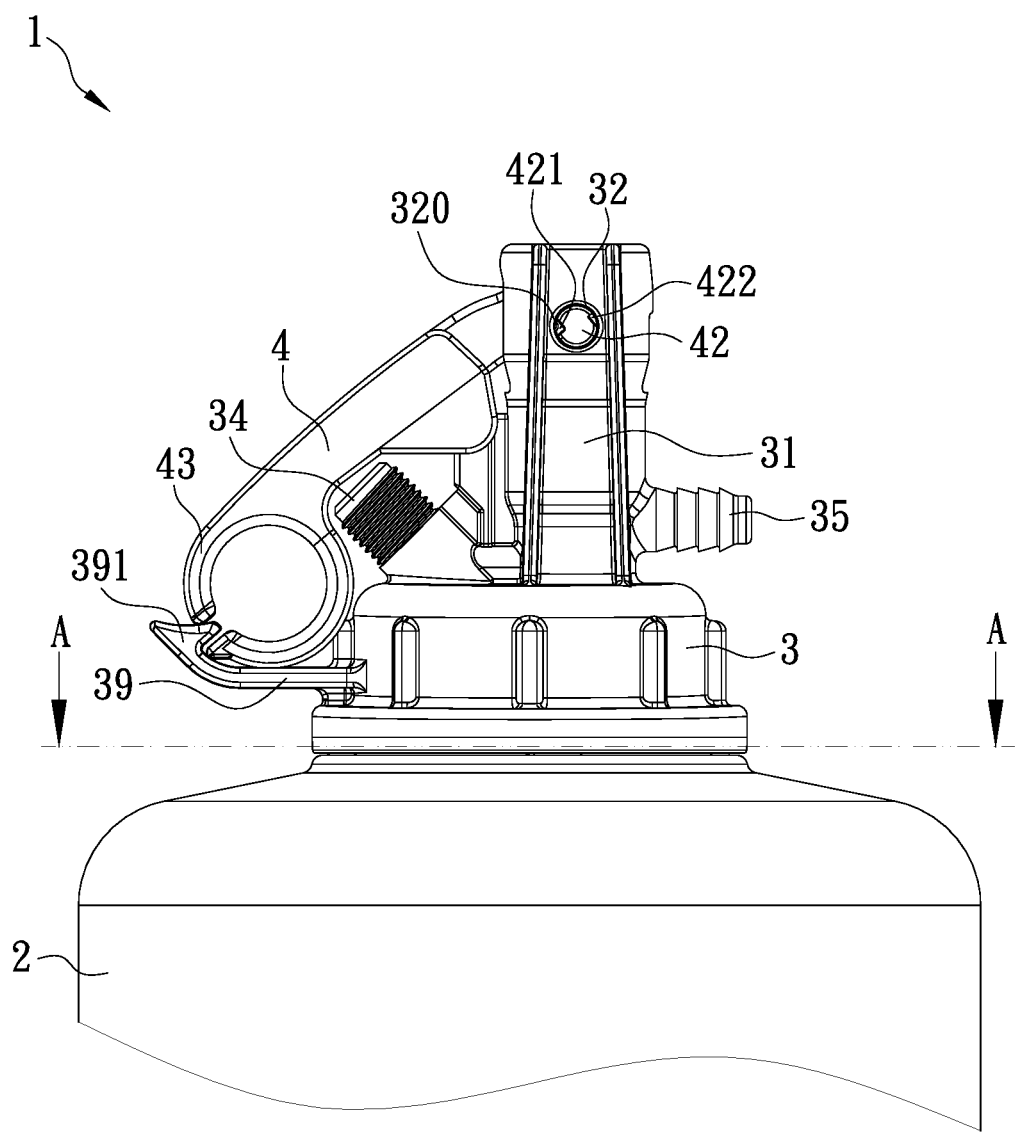
FIG. 9 is an amplified cross sectional view showing the operation of the tire sealant dispenser according to the preferred embodiment of the present invention.

With reference to FIG. 5, before using the tire sealant dispenser 1, the C-shaped actuation portion 43 of the drive element 4 is retained on the hook 391 of the flexible element 39 and stops ahead of the feeding tube 34 of the cap 3 so as to reminder user that the tire sealant dispenser 1 is not used. One indentation 421 of each post 42 of the drive element 4 is retained on the protrusion 320 of the orifice 32 of the cap 3. With reference to FIG. 5, as desiring to repair a tire, a first hose 81 is connected with the supply pipe 35 and an air nozzle (not shown) of the tire. Referring further to FIG. 6, the drive element 4 is rotated so that the eccentric cam 41 moves to and contact with a long-distance end 45 from a short-distance end 44 after contacting with the head 52 of the punch element 5, and the protrusion 320 of the orifice 32 of the cap 3 is retained on the other indentation 422 after engaging on the one indentation 421, as illustrated in FIGS. 2-9, wherein the short-distance end 44 and the long-distance end 45 are used as a starting point and a termination point of a movement of the drive element 4 respectively. In the meantime, the punch element 5 is pushed to move downward and to abut against the stepped portion 37 so that the tilted tab 58 of the punch element 5 pierces the film 38 of the passage 360 of the second tube 36, and the channel 310 of the first tube 31 of the cap 3 is in communication with the passage 360 of the second tube 36 and the accommodation chamber 23 of the body 2. Preferably, the film 38 is not removable from the passage 360 so as to avoid stopping the passage 360. As shown in FIG. 7, the O ring 54 is fitted on the punch element 5 so that a slit between the punch element 5 and the channel 310 of the first tube 31 is closed by the O ring 54, and the chemical fluid 25 of the accommodation chamber 23 of the body 2 flows out of the upper section 311 of the first tube 31. Referring to FIG. 8, a second hose 82 is connected with the air compressor (not shown) and the feeding tube 34 so that the pressurized air is inputted into the chemical fluid 25 from the air valve 341 of the air conduit 340 of the feeding tube 34, and the chemical fluid 25 flows into the guide cavity 70 and the passage 360 of the second tube 36 via the multiple gaps 75 of the bottom rim 74 of the cylindrical pipe 7, then the chemical fluid 25 flows through the multiple troughs 55 and the cutout 57 of the punch element 5, the channel 310 of the first tube 31, the sealant conduit 350 of the supply pipe 35, and the first hose 81 to communicate with the air nozzle of the tire. Furthermore, the flexible sheet 76 of the bottom rim 74 of the cylindrical pipe 7 abuts against the holder 24 of the body 2 to produce a rebounding force by which the cylindrical pipe 7 matingly contacts with the second tube 36 as moving or operating the tire sealant dispenser 1, hence the stepped shoulder 73 of the guide cavity 70 keeps abutting against the second tube 36 of the cap 3, thus inflating air into the tire effectively and repairing the tire safely.

Figure 11:
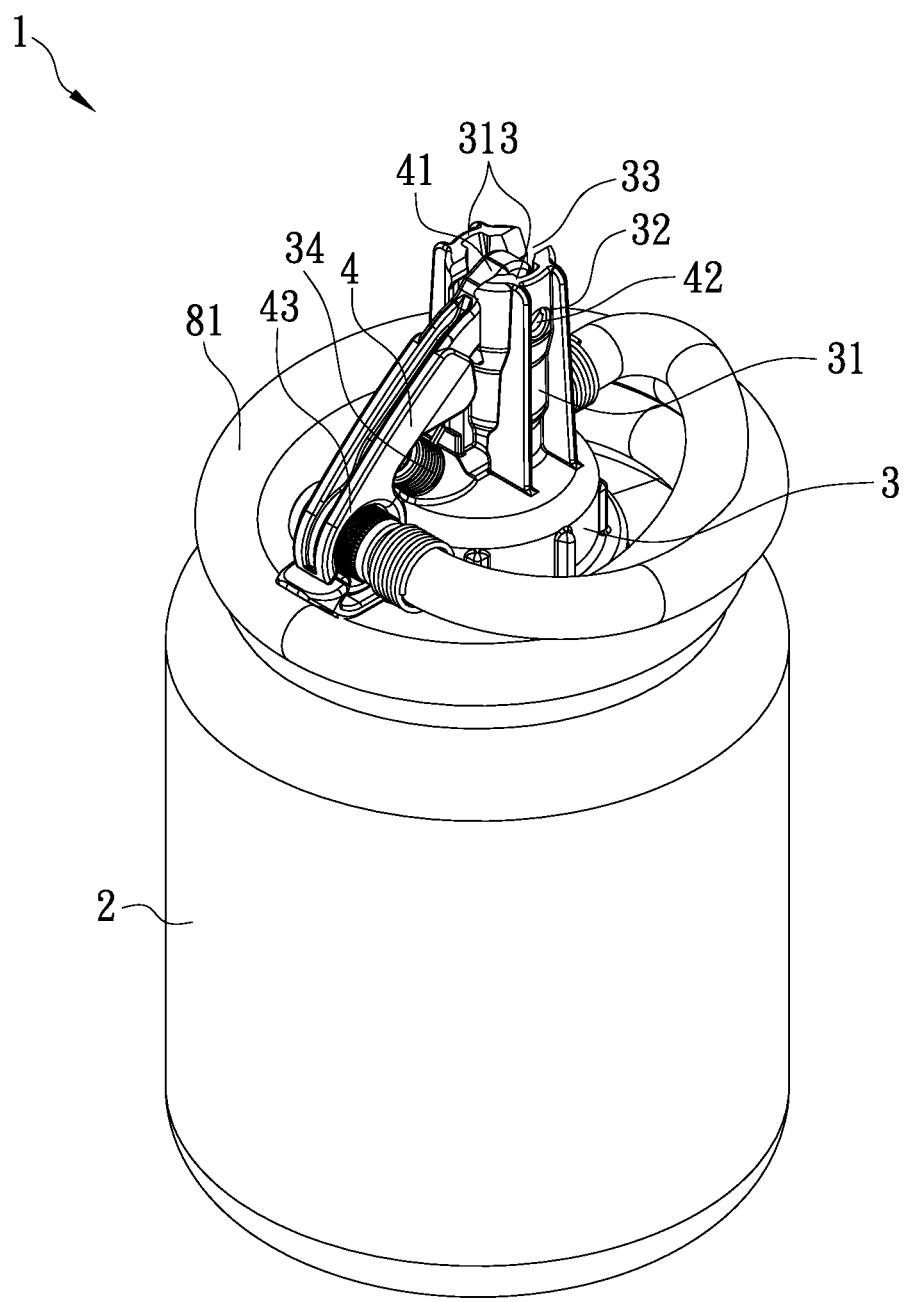
FIG. 11 is a perspective sectional view showing the operation of the tire sealant dispenser according to the preferred embodiment of the present invention.
Figure 12:
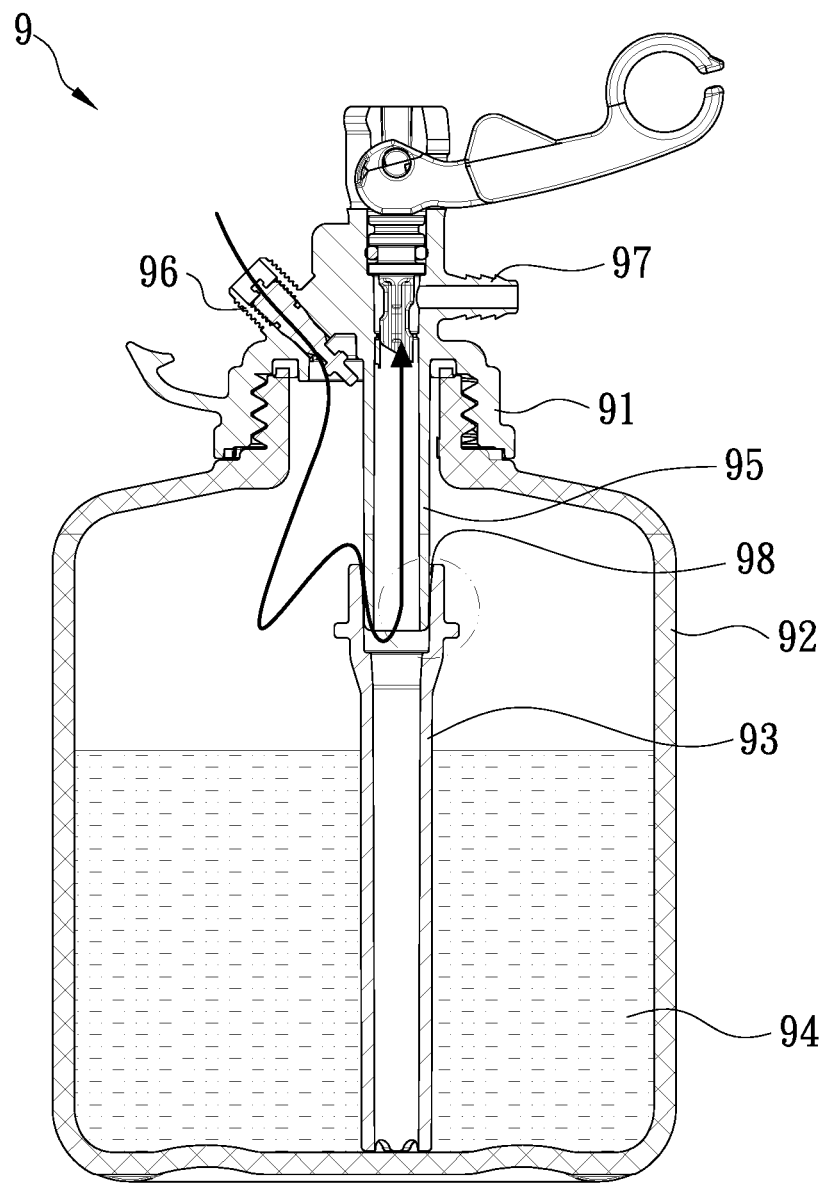
FIG. 12 is a cross sectional view of a conventional tire sealant dispenser.

With reference to FIG. 11, before using the tire sealant dispenser 1, the C-shaped actuation portion 43 of the drive element 4 is retained on the hook 391 of the flexible element 39 and stops ahead of the feeding tube 34 of the cap 3, wherein a first end of the first hose 81 is connected with the supply pipe 35, and a second end of the first hose 81 is winded around the cap 3 and is extended into the C-shaped actuation portion 43.

Thereby, the body 2 and the cap 3 of the tire sealant dispenser 1 are connected, and the cap 3 includes the feeding tube 34 and the supply pipe 35, wherein the feeding tube 34 is connected with the air compressor, the supply pipe 35 is configured to supply the chemical fluid 25, and the drive element 4 is urged to push the punch element 5 to pierce the film 38, such that the pressurized air is inputted into the chemical fluid 25 from the air valve 341 of the air conduit 340 of the feeding tube 34, and the chemical fluid 25 flows into the guide cavity 70 and the passage 360 of the second tube 36 via the multiple gaps 75 of the bottom rim 74 of the cylindrical pipe 7, then the chemical fluid 25 flows through the multiple troughs 55 and the cutout 57 of the punch element 5, the channel 310 of the lower section 312 of the first tube 31, the sealant conduit 350 of the supply pipe 35, and the first hose 81 to communicate with the air nozzle of the tire, thus inflating air into the tire effectively and repairing the tire safely.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tire sealant dispenser comprising:
   a body configured to accept a chemical fluid;
   a cap connected on an opening of the body, the cap including a first tube extending from a top of an inner wall of the cap, a second tube extending downward beyond a bottom of the inner wall of the cap and in communications with the first tube, the first tube having a channel formed in the first tube, the second tube having a passage formed in the second tube and accommodating a film configured to separate the channel of the first tube from the passage of the second tube;
   a punch element disposed in the channel of the first tube and located above the film;
   a drive element rotatably connected on the cap and configured to urge the punch element to pierce the film, such that an air conduit comes into communication with a sealant conduit, and pressurized air flows into the body via the air conduit from an air compressor, and the chemical fluid flows out of the sealant conduit;
   wherein the body is hollow and includes an accommodation chamber defined therein, the opening defined on a first end of the body, a holder formed on a second end of the body, a male threaded section arranged on an outer wall of the first end of the body outside the opening, and multiple ratchets formed below the male threaded section, wherein the accommodation chamber is configured to accommodate the chemical fluid;
   the cap includes a female threaded section arranged on the inner wall thereof, multiple recesses formed around the bottom of the inner wall of the cap, a peripheral groove surrounding the top of the inner wall of the cap to accommodate a washer;
   the female threaded section of the cap is screwed with the male threaded section of the opening of the body;
   wherein when the cap is connected with the body, the opening of the body is sealed via the washer and the cap is not removable from the opening, and after rotating the cap, the multiple recesses of the cap engage with the multiple ratchets of the body respectively, such that the cap is not removable so as to avoid leakage of the chemical fluid; and
   wherein the first tube has an upper section, a lower section, an extending portion formed outside and partially extending over the upper section, an orifice defined on the extending portion, a protrusion formed inside the orifice, and two opposite slots defined on the extending portion, wherein a top of each of the two opposite slots is open and a bottom of each slot is closed, the first tube has a feeding tube and a supply pipe, wherein the feeding tube has the air conduit defined therein and accommodating an air valve which communicates with the accommodation chamber of the body, wherein a diameter of the upper section of the first tube is greater than the lower section of the first tube, and a stepped portion is defined between the upper section and the lower section of the first tube, wherein the supply pipe has the sealant conduit defined therein and communicating with the channel of the first tube, and the cap further includes a flexible element extending outward from an outer wall thereof, and the flexible element has a hook extending from a distal end thereof.

2. The tire sealant dispenser as claimed in claim 1, wherein the punch element includes a column extending from a first end thereof, a head extending from a second end of the punch element, a notch surrounding the head, an O ring fitted in the notch, multiple troughs separately formed on the column, a rib defined between any two adjacent of the multiple troughs, a cutout formed on the rib, and a tilted tab arranged on a distal end of the column, wherein the punch element is accommodated into the channel of the first tube from the first tube of the cap and is located above the film.

3. The tire sealant dispenser as claimed in claim 1 further comprising a cylindrical pipe, and the cylindrical pipe including a guide cavity defined in the cylindrical pipe, a first segment, and a second segment, wherein a diameter of the first segment is more than the second segment, the cylindrical pipe further includes a stepped shoulder defined between the first segment and the second segment, multiple gaps formed on a bottom rim of the cylindrical pipe, and a flexible sheet extending from the bottom rim, wherein the first segment of the cylindrical pipe is fitted with the second tube of the cap, and the second tube abuts against the stepped shoulder of the guide cavity, wherein cylindrical pipes of various lengths are replaceable so as to match with bodies of different sizes; the flexible sheet of the bottom rim of the cylindrical pipe abuts against the holder of the body to produce a rebounding force by which the cylindrical pipe matingly contacts with the second tube when moving or operating the tire sealant dispenser, such that the stepped shoulder of the guide cavity keeps abutting against the second tube of the cap, thus inflating air into the tire and repairing the tire.

4. A tire sealant dispenser comprising:
   a body configured to accept a chemical fluid;
   a cap connected on an opening of the body, the cap including a first tube extending from a top of an inner wall of the cap, a second tube extending downward beyond a bottom of the inner wall of the cap and in communications with the first tube, the first tube having a channel formed in the first tube, the second tube having a passage formed in the second tube and accommodating a film configured to separate the channel of the first tube from the passage of the second tube;
   a punch element disposed in the channel of the first tube and located above the film;
   a drive element rotatably connected on the cap and configured to urge the punch element to pierce the film, such that an air conduit comes into communication with a sealant conduit, and pressurized air flows into the body via the air conduit from an air compressor, and the chemical fluid flows out of the sealant conduit; and
   a cylindrical pipe, and the cylindrical pipe including a guide cavity defined in the cylindrical pipe, a first segment, and a second segment, wherein a diameter of the first segment is more than the second segment, the cylindrical pipe further includes a stepped shoulder defined between the first segment and the second segment, multiple gaps formed on a bottom rim of the cylindrical pipe, and a flexible sheet extending from the bottom rim, wherein the first segment of the cylindrical pipe is fitted with the second tube of the cap, and the second tube abuts against the stepped shoulder of the guide cavity, wherein cylindrical pipes of various lengths are replaceable so as to match with bodies of different sizes; the flexible sheet of the bottom rim of the cylindrical pipe abuts against the holder of the body to produce a rebounding force by which the cylindrical pipe matingly contacts with the second tube when moving or operating the tire sealant dispenser, such that the stepped shoulder of the guide cavity keeps abutting against the second tube of the cap, thus inflating air into the tire and repairing the tire.

5. The tire sealant dispenser as claimed in claim 2, wherein the drive element includes an eccentric cam formed on an end thereof, a pair of posts extending outward from two sides of the eccentric cam respectively, wherein each of the pair of posts has two indentations defined on each post, the drive element further includes a C-shaped actuation portion formed on the other end thereof, and the drive element is rotatably connected with the orifice of the first tube by using the pair of posts, wherein the eccentric cam is located on an opening end of the first tube and abuts against the head of the punch element, and the C-shaped actuation portion swings along the pair of posts, the two opposite slots of the extending portion of the first tube allow the drive element to swing semi-circumferentially therealong.

6. The tire sealant dispenser as claimed in claim 5, wherein the C-shaped actuation portion of the drive element is retained on the hook of the flexible element and stops ahead of the feeding tube of the cap so as to indicate to the user that the tire sealant dispenser is not used.

7. The tire sealant dispenser as claimed in claim 5, wherein a first end of the first hose is connected with the supply pipe, and a second end of the first hose is wound around the cap and is extended into the C-shaped actuation portion.

8. The tire sealant dispenser as claimed in claim 4, wherein the body is hollow and includes an accommodation chamber defined therein, the opening defined on a first end of the body, a holder formed on a second end of the body, a male threaded section arranged on an outer wall of the first end of the body outside the opening, and multiple ratchets formed below the male threaded section, wherein the accommodation chamber is configured to accommodate the chemical fluid; the cap includes a female threaded section arranged on the inner wall thereof, multiple recesses formed around the bottom of the inner wall of the cap, a peripheral groove surrounding the top of the inner wall of the cap so as to accommodate a washer; the female threaded section of the cap is screwed with the male threaded section of the opening of the body; when the cap is connected with the body, the opening of the body is sealed via the washer and the cap is not removable from the opening without destruction; after rotating the cap, the multiple recesses of the cap engage with the multiple ratchets of the body respectively, such that the cap is not removable so as to avoid leakage of the chemical fluid.

* * * * *